United States Patent
Ferry et al.

(10) Patent No.: US 12,061,508 B2
(45) Date of Patent: Aug. 13, 2024

(54) BACKUP POWER SUPPLY SYSTEM USING A THERMOELECTRIC GENERATOR FOR MANAGING DATA BACKUP OPERATION OF AN ELECTRONIC DEVICE

(71) Applicant: Schneider Electric Industries SAS, Rueil Malmaison (FR)

(72) Inventors: Didier Ferry, Le Broc (FR); Aymeric Biehler, Cagnes-sur-Mer (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 175 days.

(21) Appl. No.: 17/723,540

(22) Filed: Apr. 19, 2022

(65) Prior Publication Data
US 2022/0342470 A1 Oct. 27, 2022

(30) Foreign Application Priority Data
Apr. 27, 2021 (EP) .................................... 21305538

(51) Int. Cl.
G06F 1/28 (2006.01)
G06F 11/14 (2006.01)
H02J 9/06 (2006.01)

(52) U.S. Cl.
CPC ............ *G06F 1/28* (2013.01); *G06F 11/1458* (2013.01); *H02J 9/061* (2013.01); *G06F 2201/84* (2013.01)

(58) Field of Classification Search
None
See application file for complete search history.

(56) References Cited

U.S. PATENT DOCUMENTS

2001/0023591 A1* 9/2001 Maeda .................... F28D 15/02
62/3.2
2008/0209237 A1* 8/2008 Kim .......................... G06F 1/30
713/300

(Continued)

FOREIGN PATENT DOCUMENTS

EP 3598511 A1 1/2020
WO 2018223100 A1 12/2018

OTHER PUBLICATIONS

Extended European Search Report dated Oct. 15, 2021 for corresponding European Patent Application No. 21305538.7-1203, 7 pages.

*Primary Examiner* — Danny Chan
(74) *Attorney, Agent, or Firm* — Locke Lord LLP

(57) ABSTRACT

A backup power supply system for managing data backup operation of an electronic device, comprising:
a DC/DC converter having a main power input and a power output;
a boost converter having a power input and a power output;
a thermoelectric generator associated with a chip and electrically connected to the power input of the boost converter, wherein the thermoelectric generator is able to heat or cool the chip;
a microcontroller electrically connected to the power outputs of the first and the second power converter, and electrically connected to a set of components able to perform data backup operation of the electronic device,
wherein the microcontroller is configured to determine an electrical energy required to perform data backup operation by the set of components,
wherein the microcontroller is configured to compute from the determined electrical energy a temperature deviation to reach by the thermoelectric generator, wherein the temperature deviation is the difference between the temperature inside the chip and the ambient temperature of the chip, (Continued)

wherein the microcontroller is configured to command the regulation of the temperature inside the chip by means of the thermoelectric generator to reach the temperature deviation, wherein the microcontroller is configured to supply electrical energy to the set of components when data backup operation is triggered, the electrical energy being converted from the heat flux of the temperature deviation from the chip.

9 Claims, 2 Drawing Sheets

(56) References Cited

U.S. PATENT DOCUMENTS

| | | | |
|---|---|---|---|
| 2011/0128698 A1* | 6/2011 | Nishioka | G06F 1/203 |
| | | | 361/679.46 |
| 2013/0133710 A1 | 5/2013 | Ludwig | |
| 2014/0372772 A1* | 12/2014 | McKnight | G06F 9/4893 |
| | | | 713/300 |
| 2015/0288187 A1* | 10/2015 | Poitrast | H02J 7/00712 |
| | | | 320/101 |
| 2016/0062435 A1* | 3/2016 | Arakawa | G06F 1/263 |
| | | | 713/340 |
| 2016/0070318 A1* | 3/2016 | Wu | G06F 1/20 |
| | | | 361/679.54 |

* cited by examiner

BACKUP POWER SUPPLY SYSTEM USING A THERMOELECTRIC GENERATOR FOR MANAGING DATA BACKUP OPERATION OF AN ELECTRONIC DEVICE

FIELD OF INVENTION

The present disclosure relates generally to a backup power source for supplying power to an electronical device, based on the thermoelectric effect, when a voltage of a primary power source for the electronical device drops under a predefined value.

BACKGROUND

Some electronical devices can be supplied with backup energy by capacitors as secondary power source after the voltage of a primary power source for the electronical device has dropped to zero. More especially, this secondary power source supplies a microcontroller for a sufficient period of time to perform data backup operation. These capacitors require a high volume and may not be practical when the electronic device is of small size.

This traditional management and energy source of a microcontroller during backup data is made of multiples aluminum capacitors placed in parallel with MOS transistor in serial. This implies a costly and bulky solution, presenting a short mean time between failures (MTBF) due to thermal sensitivity of capacitors.

There is therefore a need for an efficient management of a backup power source of an electronic device for a data backup operation of the electronic device after a shutdown of the electronic device.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for managing data backup operation of an electronic device by a backup power supply system comprising a DC/DC converter having a main power input and a power output, a boost converter having a power input and a power output, a thermoelectric generator associated with a chip and electrically connected to the power input of the Boost DC/DC converter, wherein the thermoelectric generator is able to heat or cool the chip, and a microcontroller electrically connected to the power outputs of the first and the second power converter and electrically connected to a set of components able to perform data backup operation of the electronic device, the method comprising:

determining, by the microcontroller, an electrical energy required to perform data backup operation by the set of components, computing, by the microcontroller, from the determined electrical energy a temperature deviation to reach by the thermoelectric generator, wherein the temperature deviation is the difference between the temperature inside the chip and the ambient temperature of the chip, commanding, by the microcontroller, the regulation of the temperature inside the chip by the thermoelectric generator to reach the temperature deviation, supplying electrical energy, by the microcontroller, to the set of components when data backup operation is triggered, the electrical energy being converted from the heat flux of the temperature deviation from the chip.

Advantageously, the method allows to manage and optimize electrical energy for data backup operation by keeping powered only essential components of the electronic device. In case of sudden interruption of power supply to the electronic device, it can be prevented any damage or loss of data for the microcontroller.

In an embodiment, a data backup operation is triggered when a voltage of the main power input drops under a predefined value.

In an embodiment, the microcontroller is connected to a set of sensors that is able to monitor the power consumption of the set of components during any data backup operation.

In an embodiment, the set of sensors retrieves values of voltage and current of the set of components during a data backup operation and the duration required to perform the data backup operation.

In an embodiment, the microcontroller determines the electrical energy required to perform data backup operation by the set of components based on the values retrieved by the set of sensors.

In an embodiment, the determined electrical energy is updated after each data backup operation, depending on the variations of the values retrieved by the set of sensors.

In an embodiment, the thermoelectric generator is a Peltier-element.

In an embodiment, the thermoelectric generator TEG is able to heat or cool the chip for the regulation of the temperature inside the chip. The thermal management of the chip by cooling or heating the chip optimizes the lifetime of the chip.

In another implementation, there is provided a backup power supply system for managing data backup operation of an electronic device, comprising:

a DC/DC converter having a main power input and a power output;

a boost converter having a power input and a power output;

a thermoelectric generator associated with a chip and electrically connected to the power input of the boost converter, wherein the thermoelectric generator is able to heat or cool the chip;

a microcontroller electrically connected to the power outputs of the first and the second power converter, and electrically connected to a set of components able to perform data backup operation of the electronic device, wherein the microcontroller is configured to determine an electrical energy required to perform data backup operation by the set of components, wherein the microcontroller is configured to compute from the determined electrical energy a temperature deviation to reach by the thermoelectric generator, wherein the temperature deviation is the difference between the temperature inside the chip and the ambient temperature of the chip, wherein the microcontroller is configured to command the regulation of the temperature inside the chip by means of the thermoelectric generator to reach the temperature deviation, wherein the microcontroller is configured to supply electrical energy to the set of components when data backup operation is triggered, the electrical energy being converted from the heat flux of the temperature deviation from the chip.

In another implementation there is provided a computer-readable medium having embodied thereon a computer program for executing a method for managing data backup operation of an electronic device. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
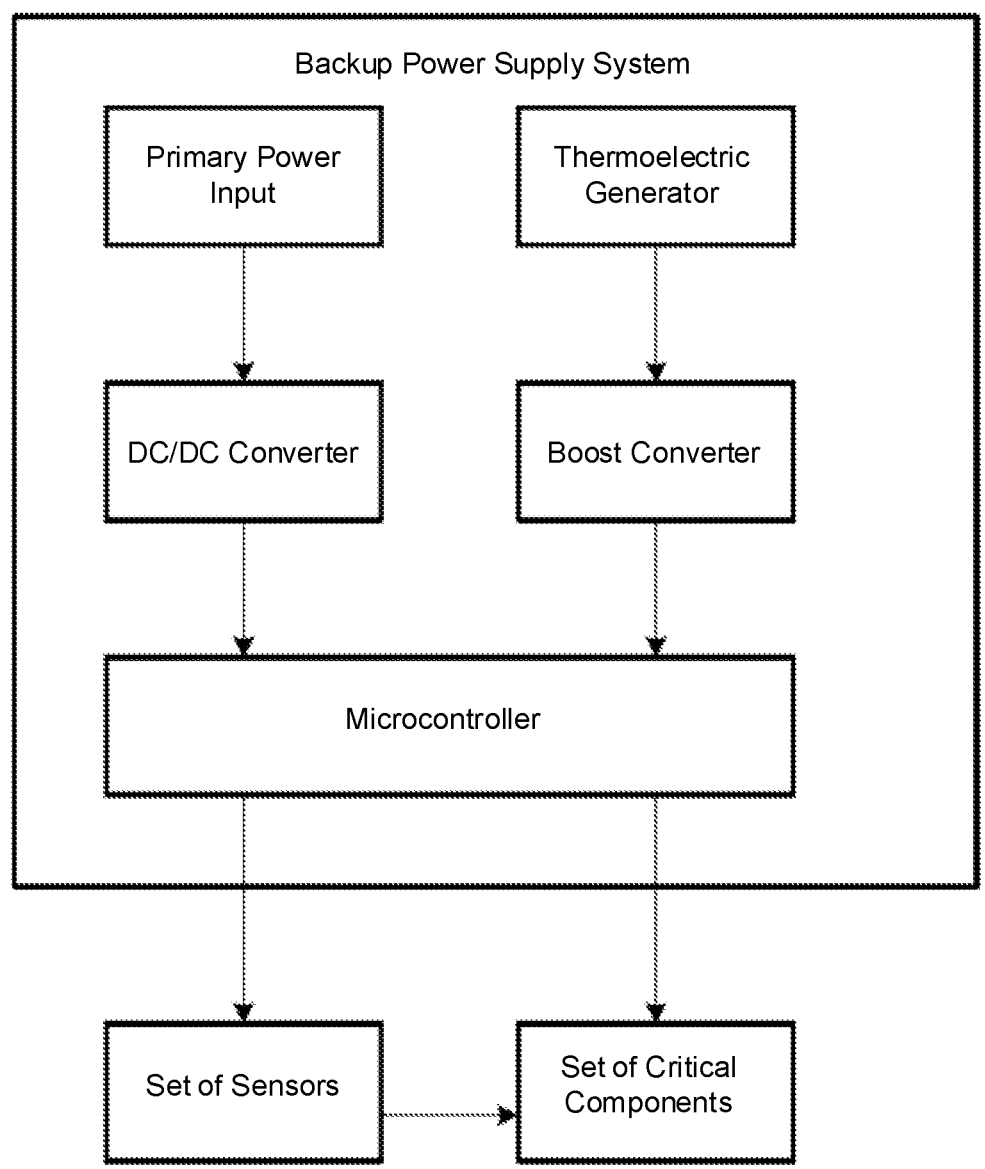
FIG. 1 illustrates schematically an example of a backup power supply system for managing data backup operation of an electronic device according to one embodiment of the invention.

FIG. 1 is a block diagram depicting an embodiment of a backup power supply system BPS for an electronic device. The electronic device may be any device performing actions using electronic components. The backup power supply system BPS includes a microcontroller MCT, a primary power input PI that provides a power input to a DC/DC converter DCV and a thermoelectric generator TEG that provides a power input to a boost converter BCV. The backup power supply system BPS is implemented on a printed circuit board of the electronic device.

The microcontroller MCT is electrically connected to both the DC/DC converter DCV and the boost converter BCV and is able to selectively output power from one of the DC/DC converter DCV and the boost converter BCV to the power input of a set of sensors SS and to the power input of a set of critical components SC of the printed circuit board of the electronic device.

Especially, the set of critical components SC of the printed circuit board is able to perform data backup operation when power supply to the printed circuit board falls under a defined threshold. For example, the set of critical components comprises a microprocessor and memories, including a non-volatile memory, storing data relating to the operating context of the electronic device in the memories. The data backup operation occurs when the electronic device is powered down and stores essential values needed for the proper functioning for the electronic device when it is rebooted. These essential values are data relating to the operating context of the electronic device just before the power outage.

The printed circuit board of the electronic device further contains a set of peripheric components SPC that are non-essential to perform data backup operation. For example, the set of peripheric components comprises LEDs, Ethernet ports, etc.

The printed circuit board contains at least two rails for power supply of components of the printed circuit board, one acting as an Uninterruptible Power Source (UPS) and another one acting as an Interruptible Power Source (IPS).

The set of critical components SC and the set of sensors SS are powered by the Uninterruptible Power Source, whereas the peripheric set of components is powered by the Interruptible Power Source.

More especially, the two rails for UPS and IPS can be powered by the DC/DC converter DCV, whereas the rail for UPS can be powered by the boost converter BCV as backup power source when the primary power input PI fails.

The thermoelectric generator TEG is a Peltier-element that is in direct thermal contact with a chip of the printed circuit board and operates according to the Peltier effect. The effect creates a temperature difference by transferring heat between two electrical junctions. A voltage is applied across joined conductors to create an electric current. When the current flows through the junctions of the two conductors, heat is removed at one junction and cooling occurs. Heat is deposited at the other junction. The main application of the Peltier effect is cooling. However the Peltier effect can also be used for heating or control of temperature. In every case, a
DC voltage is required.

The voltage supplied by the thermoelectric generator TEG is fed to the boost converter BCV. The boost converter BCV is a DC-to-DC power converter that steps up the voltage from the thermoelectric generator TEG at its input to a higher voltage at its output while stepping down current.

The microcontroller MCT is able to command the heating or cooling of the chip by the thermoelectric generator TEG.

The microcontroller MCT is connected to the set of sensors SS that is able to monitor the power consumption of the set of critical components. More especially, during a data backup operation after a power down of the primary power input PI, the set of sensors SS can monitor the ambient temperature, the voltage and current of the set of critical components and thus retrieve the real time power consumption of the set of critical components. Moreover, the set of sensors SS can monitor the duration required to perform the data backup operation.

The microcontroller MCT implements an algorithm which determines an electrical energy required to perform data backup operation by the set of critical components.

The algorithm takes as input the values retrieved by the set of sensors during data backup operation: the duration of the data backup operation, the ambient temperature and the real time power consumption of the set of critical components. With the duration of the data backup operation and the real time power consumption of the set of critical components, the microcontroller MCT can determine the electrical energy required to perform data backup operation by the set of critical components.

At each data backup operation, the determined electrical energy is updated as the values retrieved by the set of sensors are changing.

In one embodiment, the algorithm takes into account the ageing of the set of critical components. For example, the algorithm learns the evolution of the required electrical energy determined for at least two consecutive data backup operations with the same ambient temperature. An increase of the determined electrical energy is an indication of the ageing of at least some of the components. The indication of ageing can be used to adjust a determined electrical energy, for example by adding a margin to the determined electrical energy.

Thus the determined electrical energy can be updated regularly, for example after each data backup operation, depending on the variations of the values retrieved by the set of sensors.

For example, the microcontroller MCT is initially set up default values related to the set of critical components. In one embodiment, the algorithm is updated a first time to define an electrical energy required to perform backup operation by initiating a data backup operation.

The microcontroller MCT is configured to compute from the determined electrical energy a temperature deviation to reach by the chip, wherein the temperature deviation is the difference between the temperature inside the chip and the ambient temperature of the chip.

The thermoelectric generator TEG is able to convert the heat flux of the temperature deviation from the chip into electrical energy. According to the properties of the thermoelectric generator TEG, the microcontroller MCT can compute the required temperature deviation of the chip in order that the thermoelectric generator TEG converts the corresponding heat flux from the chip into the determined electrical energy.

It is assumed that the chip is selected for having the property to present in operation a temperature inside the chip always hotter than the ambient temperature of the chip. For instance, the chip is a microprocessor.

The microcontroller MCT is also configured to command the regulation of the temperature inside the chip by means of the thermoelectric generator to reach the computed temperature deviation. Thanks to the Peltier effect, the thermoelectric generator can operate for heating or cooling the temperature of the chip. The thermoelectric generator is instructed to control the temperature inside the chip in view of the ambient temperature to reach always substantially the computed temperature deviation.

For example, at a given ambient temperature, if the current temperature deviation is too high, the microcontroller MCT commands the thermoelectric generator to heat the chip in order to reduce current temperature deviation and to reach the determined temperature deviation.

The microcontroller MCT is configured to supply electrical energy to the set of critical components when data backup operation is triggered, the electrical power being converted from the heat flux of the temperature deviation from the chip. In this case, the thermoelectric generator TEG converts the heat flux of the temperature deviation from the chip into electrical power, which corresponds to the power consumption need for the set of components during the backup operation.

Figure 2:
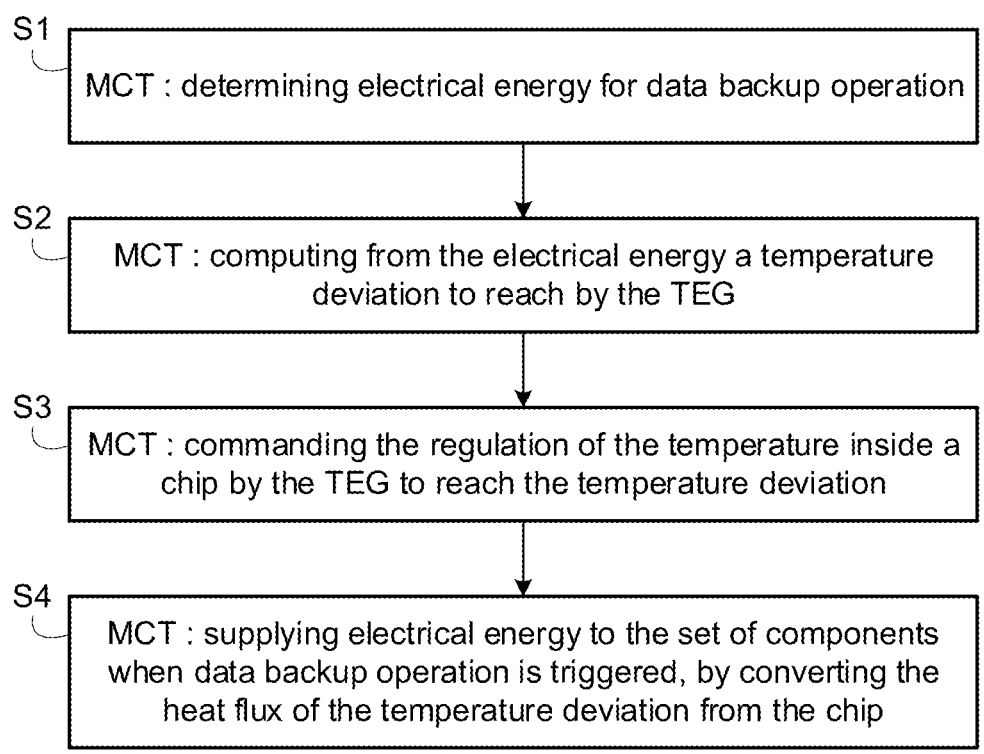
FIG. 2 shows a flow chart illustrating a method for managing data backup operation of an electronic device according to one embodiment of the invention.

Referring to FIG. 2, a method for managing data backup operation of an electronic device according to one embodiment of the invention comprises steps S1 to S4.

In step S1, a data backup operation is performed by the set of critical components and the microcontroller MCT determines an electrical energy required to perform data backup operation by the set of components. Step S1 is triggered each time a power supply by the main power input to the printed circuit board falls under a defined threshold. The data backup operation is monitored by the set of sensors that retrieves values of the ambient temperature, the voltage and current of the set of critical components.

In step S2, the microcontroller MCT computes from the determined electrical energy a temperature deviation to reach by the thermoelectric generator TEG, wherein the temperature deviation is the difference between the temperature inside the chip and the ambient temperature of the chip.

The computed temperature deviation of the chip should correspond to a heat flux from the chip that the thermoelectric generator TEG is able to convert into a quantity of electrical energy substantially equal to the determined electrical energy. The computed temperature deviation thus depends on the properties of the thermoelectric generator TEG associated with the chip.

In step S3, the microcontroller MCT commands the regulation of the temperature inside the chip by means of the thermoelectric generator to reach the temperature deviation.

During normal operation, the printed circuit board of the electronic device is supplied with electrical energy by the primary power input PI and the thermoelectric generator is designed and configured for supplying the set of critical components SC with electrical energy in case the voltage of the primary power input drops to zero or under a predefined value defining a level needed to sufficiently supply the set of critical components.

Depending on the ambient temperature and the current temperature inside the chip, the thermoelectric generator regulates the temperature inside the chip to reach the computed temperature deviation.

In step S4, when a data backup operation is triggered, for example in case the voltage of the primary power input drops to zero, the microcontroller MCT is configured to supply electrical energy to the set of critical components, the electrical energy being converted by the thermoelectric generator TEG from the heat flux of the temperature deviation from the chip. As the temperature inside the chip was regulated to reach the temperature deviation in normal operation, the thermoelectric generator TEG is able to supply the electrical energy previously determined and required to perform the data backup operation.

More especially, the microcontroller only supplies the rail for UPS and switch off the rail for IPS, allowing only the set of critical elements to perform the data backup operation and the set of sensors to monitor the set of critical elements. In one example, the set of critical elements requires a power around 5 W while the set of sensors requires a power around 0,1 W.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for managing data backup operation of an electronic device by a backup power supply system comprising a DC/DC converter having a main power input and a power output, a boost converter having a power input and a power output, a thermoelectric generator associated with a chip and electrically connected to the power input of the boost converter, wherein the thermoelectric generator is able to heat or cool the chip, and a microcontroller electrically connected to the power outputs of the DC/DC converter and the boost converter and electrically connected to a set of components able to perform data backup operation of the electronic device, the method comprising:
   determining, by the microcontroller, an electrical energy required to perform data backup operation by the set of components,
   computing, by the microcontroller, from the determined electrical energy a temperature deviation to reach by the thermoelectric generator, wherein the temperature deviation is the difference between the temperature inside the chip and the ambient temperature of the chip,
   commanding, by the microcontroller, the regulation of the temperature inside the chip by the thermoelectric generator to reach the temperature deviation,
   supplying electrical energy, by the microcontroller, to the set of components when data backup operation is triggered, the electrical energy being converted by the thermoelectric generator from the heat flux of the temperature deviation from the chip,
   wherein a set of sensors retrieves values of voltage and current of the set of components during a data backup operation and the duration required to perform the data backup operation, and
   wherein the microcontroller determines the electrical energy required to perform the data backup operation by the set of components based on the values retrieved by the set of sensors.

2. The method according to claim 1, wherein a data backup operation is triggered when a voltage of the main power input drops under a predefined value.

3. The method according to claim 1, wherein the set of sensors is able to monitor the power consumption of the set of components during any data backup operation.

4. The method according to claim 1, wherein the determined electrical energy is updated after each data backup operation, depending on the variations of the values retrieved by the set of sensors.

5. The method according to claim 1, wherein the thermoelectric generator is a Peltier-element.

6. The method according to claim 1, wherein the thermoelectric generator is able to heat or cool the chip for the regulation of the temperature inside the chip.

7. The method according to claim 6, wherein the thermoelectric generator regulates the temperature inside the chip in view of the ambient temperature to reach the computed temperature deviation.

8. A backup power supply system for managing data backup operation of an electronic device, comprising:
   a DC/DC converter having a main power input and a power output;
   a boost converter having a power input and a power output;
   a thermoelectric generator associated with a chip and electrically connected to the power input of the boost converter, wherein the thermoelectric generator is able to heat or cool the chip;
   a microcontroller electrically connected to the power outputs of the DC/DC converter and the boost converter, and electrically connected to a set of components able to perform data backup operation of the electronic device,
   wherein the microcontroller is configured to determine an electrical energy required to perform data backup operation by the set of components,
   wherein the microcontroller is configured to compute from the determined electrical energy a temperature deviation to reach by the thermoelectric generator, wherein the temperature deviation is the difference between the temperature inside the chip and the ambient temperature of the chip,
   wherein the microcontroller is configured to command the regulation of the temperature inside the chip by means of the thermoelectric generator to reach the temperature deviation,
   wherein the microcontroller is configured to supply electrical energy to the set of components when data backup operation is triggered, the electrical energy being converted by the thermoelectric generator from the heat flux of the temperature deviation from the chip,
   wherein a set of sensors retrieves values of voltage and current of the set of components during a data backup operation and the duration required to perform the data backup operation, and
   wherein the microcontroller determines the electrical energy required to perform the data backup operation by the set of components based on the values retrieved by the set of sensors.

9. A non-transitory computer-readable medium having embodied thereon a computer program for executing the method for managing data backup operation of an electronic device according to claim 1.

* * * * *